UNITED STATES PATENT OFFICE.

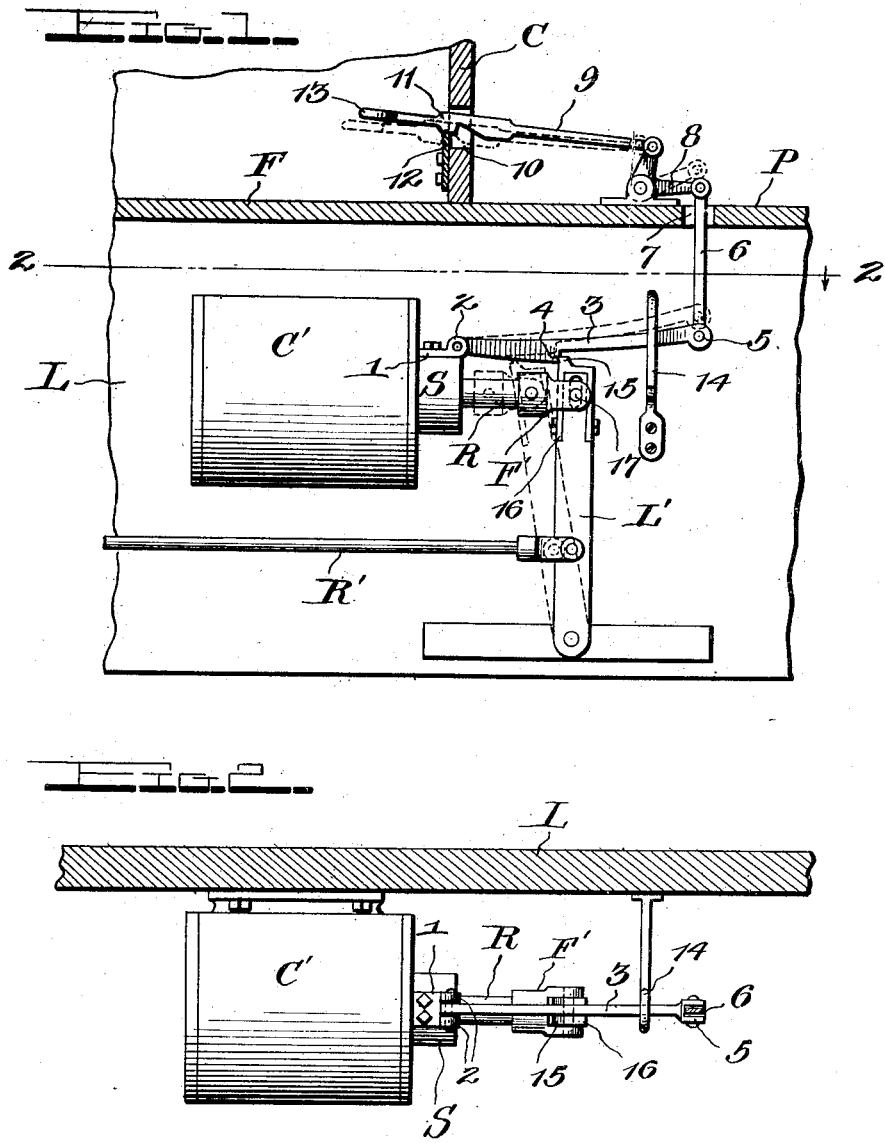

ANDREW A. LINAM, OF PURCELL, OKLAHOMA.

BRAKE-LOCK.

1,127,035.

Specification of Letters Patent.

Patented Feb. 2, 1915.

Application filed September 24, 1914. Serial No. 863,334.

*To all whom it may concern:*

Be it known that I, ANDREW A. LINAM, a citizen of the United States, residing at Purcell, in the county of McClain and State of Oklahoma, have invented certain new and useful Improvements in Brake-Locks; and I do declare the following to be a full, clear, and exact description of the invention, such as will enable others skilled in the art to which it appertains to make and use the same.

My invention relates to improvements in locks for retaining brakes on locomotives or other railway rolling stock, in set position.

It is a well known fact that the air brakes of locomotives and other coaches, left standing on sidings or in freight yards, often become released by the fact that the air pressure within the brake operating cylinders decreases. This often causes serious accidents by allowing the locomotive or other coach, to shift upon the track.

In view of the above, it is highly desirable to provide simple means whereby the air brakes of a locomotive or other coach may be positively locked in active position.

This my invention aims to accomplish by the provision of certain novel features of construction and combination herein described and claimed and shown in the drawings wherein:—

Figure 1 is a vertical section through a portion of a locomotive cab showing the application of my invention, the parts being shown in the position which they assume when locking the brakes in active position; and Fig. 2 is a horizontal section as seen on the line 2—2 of Fig. 1.

In the accompanying drawing, I have shown a portion of a locomotive L which is equipped with the usual cab C and floor F for said cab, said floor constituting a platform P in rear of the cab. Located beneath the floor F, is the usual fluid pressure cylinder C′ which, through the instrumentality of a piston (not shown) projects and retracts a piston rod R, the latter carrying a fork F′ on its free end. The fork F′ embraces a brake applying lever L′ which is pivoted to a portion of the locomotive and to which a link or rod R′ is pivoted, said rod being connected to the brake operating mechanism in a well known manner, forming no part of the present invention.

Secured upon the top of the usual stuffing box S, on one end of the cylinder C′, is a plate 1 which is provided with a pair of ears 2 between which one end of a latching lever 3 is pivoted, said lever having a depending shoulder or nose 4 formed intermediate its ends and being pivoted at 5 to an upright operating link 6 which rises through an opening 7 in the platform P, the upper end of said link 6 being pivoted to the horizontal arm of a bell crank lever 8, while an operating rod 9 is pivoted to the upright arm of said lever, said arm projecting through an opening 10 in the rear wall of the cab C and having a depending nose 11, coacting with a stopplate 12 and being provided with an operating hand grip 13 on its inner end. As clearly seen the free end of the lever 3 is guided in its vertical movement by an upright guide 14. Coacting with the nose 4, is a stop or nose 15 which rises from a U-shaped plate 16, the latter straddling the upper end of the lever L′ and being secured thereon by a bolt 17.

With the parts as above described, when the rod R is projected to rock the lever L′ in a direction to apply the brakes, the nose 4 may be forced into the return path of the nose 15 by raising the inner end of the rod 9 to disengage its nose 11. This operation positions the parts as seen in full lines in Fig. 1, in which position, the lever L′ is locked in active position, thereby preventing retraction of the brakes until the lever 3 is raised to the dotted line position, seen in Fig. 1 by proper actuation of the rod 9. It will likewise be seen, by reference to the dotted lines in Fig. 1, that the lever 3 may be locked in inactive position by engaging the nose 11 with the plate 12, thereby preventing the locking lever 3 from becoming active when the brakes are in actual service, that is, when the locomotive or coach is being propelled.

From the foregoing description, taken in connection with the accompanying drawings, it will be seen that I have produced an extremely simple construction which may be readily attached to the air brake system of practically any locomotive or coach and that this system possesses numerous advantageous features for carrying out the objects of the invention.

Having thus described my invention, what I claim as new and desire to secure by Letters Patent is:—

1. The combination with a fluid pressure cylinder, a piston rod sliding through one end thereof, and a brake applying lever having one end pivoted directly to said piston rod, of a nose rigidly secured to the lever, and a releasable catch coacting with said nose to retain the lever in active position.

2. The combination with a fluid pressure cylinder, a piston rod sliding through one end thereof, and a brake applying lever having one end pivoted directly to said piston rod, of a U-shaped plate rigidly secured to and straddling said lever, a nose on said plate, and a releasable catch coacting with said nose to retain said lever in active position.

3. The combination with a fluid pressure cylinder, a piston rod slidable through one end thereof, and a brake applying lever having one of its ends mounted upon a relatively fixed pivot, of a plate rigidly secured to one end of said lever and having a stop projecting longitudinally from one end thereof, a locking lever pivoted near the piston rod and having a stop coacting with the stop on said first mentioned lever for locking the latter in active position, and operating means for swinging said locking lever to active and inactive position.

4. The combination with a fluid pressure cylinder, a piston rod slidable through one end thereof, and a brake applying lever having one of its ends mounted upon a relatively fixed pivot, of a U-shaped plate straddling the free end of said lever and having a nose, a locking lever pivoted near the piston rod and having a nose coacting with the nose on said U-shaped plate for retaining the brake applying lever in active position, and means for moving said locking lever to active and inactive position.

5. The combination with a fluid pressure cylinder having a stuffing box on one end, a piston rod slidable through said stuffing box, a brake applying lever pivotally connected at its upper end to said piston rod and having its lower end mounted on a relatively fixed pivot, a U-shaped plate straddling the upper end of said lever and having an upstanding nose, a plate secured to the upper side of said stuffing box, a substantially horizontal locking lever pivoted at one end to said plate and having a depending nose coacting with the nose on said brake applying lever, and means whereby said locking lever may be moved to active and inactive position.

6. The combination with a fluid pressure cylinder having a stuffing box on one end, a piston rod slidable through said stuffing box, a brake applying lever pivotally connected at its upper end to said piston rod and having its lower end mounted on a relatively fixed pivot, a U-shaped plate straddling the upper end of said lever and having an upstanding nose, a plate secured to the upper side of said stuffing box, a substantially horizontal locking lever pivoted at one end of said plate and having a depending nose, an upright link pivoted to the free end of said locking lever, a bell crank lever having one of its arms pivoted to the upper end of said link, a substantially horizontal operating rod pivoted to the other arm of said bell crank lever and having a depending nose, and a locking plate beneath said nose and coacting therewith for retaining the operating rod in retracted position.

In testimony whereof I have hereunto set my hand in presence of two subscribing witnesses.

ANDREW A. LINAM.

Witnesses:
J. D. T. BRYAN,
G. M. RICHARDS.

Copies of this patent may be obtained for five cents each, by addressing the "Commissioner of Patents, Washington, D. C."